United States Patent
Nakamori et al.

(10) Patent No.: US 9,456,392 B2
(45) Date of Patent: Sep. 27, 2016

(54) MOBILE STATION AND COMMUNICATION METHOD

(71) Applicant: NTT DOCOMO, INC., Chiyoda-ku (JP)

(72) Inventors: Takeshi Nakamori, Chiyoda-ku (JP); Masashi Ishihara, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/364,223

(22) PCT Filed: Feb. 13, 2013

(86) PCT No.: PCT/JP2013/053416
§ 371 (c)(1),
(2) Date: Jun. 10, 2014

(87) PCT Pub. No.: WO2013/129113
PCT Pub. Date: Sep. 6, 2013

(65) Prior Publication Data
US 2014/0378134 A1    Dec. 25, 2014

(30) Foreign Application Priority Data
Mar. 1, 2012 (JP) ................. 2012-045166

(51) Int. Cl.
*H04W 36/00* (2009.01)
(52) U.S. Cl.
CPC ..... *H04W 36/0083* (2013.01); *H04W 36/0094* (2013.01)
(58) Field of Classification Search
CPC ... H04W 36/14; H04W 36/22; H04W 36/34; H04W 36/0022
USPC .......... 455/436–439, 134, 135, 161.3, 150.1, 455/161.1; 370/331, 332
See application file for complete search history.

(56) References Cited

U.S. PATENT DOCUMENTS

2009/0059861 A1*  3/2009  Gunnarsson et al. ........ 370/331
2010/0255833 A1  10/2010  Ishii
(Continued)

FOREIGN PATENT DOCUMENTS

JP   2011 259194   12/2011
WO  2009 057481    5/2009
(Continued)

OTHER PUBLICATIONS

3GPP TS 36.214, V10.1.0, $3^{rd}$ Generation Partnership Project; Technical Specification Group Radio Access Network; Evolved Universal Terrestrial Radio Access (E-UTRA); Physical layer; Measurements (Release 10), pp. 1-13, (Mar. 2011).

(Continued)

*Primary Examiner* — Cong Tran
(74) *Attorney, Agent, or Firm* — Oblon, McClelland, Maier & Neustadt, L.L.P.

(57) ABSTRACT

A mobile station includes a parameter retrieval unit that retrieves information representing carrier frequencies of a serving cell and a neighboring cell from a radio base station, a frequency band setting unit that sets a frequency band for measuring radio quality of the serving cell and the neighboring cell, based on the information representing the carrier frequencies of the serving cell and the neighboring cell, and a measurement unit that measures the radio quality of the serving cell and the neighboring cell, based on the set frequency band.

7 Claims, 12 Drawing Sheets

(56) References Cited

U.S. PATENT DOCUMENTS

| | | | |
|---|---|---|---|
| 2010/0271965 | A1 | 10/2010 | Siomina et al. |
| 2010/0273487 | A1* | 10/2010 | Alonso-Rubio .... H04W 36/385 455/436 |
| 2011/0281615 | A1 | 11/2011 | Yamada et al. |
| 2012/0064897 | A1* | 3/2012 | Amirijoo et al. ............. 455/436 |
| 2013/0188499 | A1* | 7/2013 | Mach et al. ................. 370/252 |

FOREIGN PATENT DOCUMENTS

| | | |
|---|---|---|
| WO | 2010 073830 | 7/2010 |
| WO | WO 2011/057300 A2 | 5/2011 |

OTHER PUBLICATIONS

3GPP TS 36.211, V10.3.0, $3^{rd}$ Generation Partnership Project; Technical Specification Group Radio Access Network; Evolved Universal Terrestrial Radio Access (E-UTRA); Physical channels and Modulation (Release 10), pp. 1-103, (Sep. 2011).
3GPP TS 36.101, V10.4.0, $3^{rd}$ Generation Partnership Project; Technical Specification Group Radio Access Network; Evolved Universal Terrestrial Radio Access (E-UTRA); User Equipment (UE) radio transmission and reception (Release 10), pp. 1-243, (Sep. 2011).
3GPP TS 36.104, V10.4.0, $3^{rd}$ Generation Partnership Project; Technical Specification Group Radio Access Network; Evolved Universal Terrestrial Radio Access (E-UTRA); Base Station (BS) radio transmission and reception (Release 10), pp. 1-109, (Sep. 2011).
3GPP TS 36.213, V10.3.0, $3^{rd}$ Generation Partnership Project; Technical Specification Group Radio Access Network; Evolved Universal Terrestrial Radio Access(E-UTRA); Physical layer procedures (Release 10), pp. 1-122, (Sep. 2011).
International Search Report Issued Apr. 2, 2013 in PCT/JP13/053416 Filed Feb. 13, 2013.
European Office Action dated Oct. 21, 2015, issued in European Patent Application No. 13755400.2.
Japanese Office Action dated Jan. 5, 2016, issued in Japanese Patent Application No. 2012-045166 (with English translation).
Qualcomm Incorporated: "Wideband RRM Measurements", 3GPP Draft; R4-120463, $3^{rd}$ Generation Partnership Project (3GPP), vol. RAN WG4, No. Dresden, Jan. 30, 2012, XP050568168.
Japanese Office Action mailed Aug. 9, 2016, issued in Japanese Patent Application No. 2012-045166 (with English Translation).

* cited by examiner

MOBILE STATION AND COMMUNICATION METHOD

TECHNICAL FIELD

The present invention relates to a radio communication system.

BACKGROUND ART

In a mobile communication system including a plurality of cells, when a mobile station (User Equipment: UE) moves from one cell to another cell, the mobile station continues communication by switching the cell. Such switching of the cell is called "Mobility control." More specifically, it is called a "cell reselection," or "handover."

When received power or received quality of a signal from a neighboring cell becomes greater than receiving power or received quality of a signal from a serving cell, a mobile station executes a cell reselection or handover to the neighboring cell.

A cell reselection is a process, with which a mobile station being in a waiting state (i.e., an idle mode) transfers from a serving cell to a neighboring cell. Handover is a process, with which a mobile station being in a communication state (i.e., a connected mode) transfers from a serving cell to a neighboring cell.

Namely, a mobile station measures received power or received quality of signals from a serving cell and a neighboring cell, respectively, regardless of whether the mobile station is in the waiting state or the mobile station is in a state, in which the mobile station transmits data to and receives data from the serving cell.

Here, the received power of the signal from the neighboring cell or the serving cell is, for example, "received power (Reference Signal Received Power: RSRP) of a downlink reference signal (Reference Signal: RS)," which is transmitted from the neighboring cell or the serving cell. The received quality is, for example, "received quality (Reference Signal Received Quality: RSRQ) which is a ratio between RSRP and total received power of a down link (Received Signal Strength Indicator: RSSI)" (cf. Non-Patent Document 1, for example).

Here, a case is explained in which a mobile station is not able to accurately measure received power or received quality of a serving cell or a neighboring cell. For example, when the mobile station determines the received power or the received quality of the serving cell or the neighboring cell to be greater than its actual value, it is possible that a cell reselection or handover is not correctly executed. In this case, it is possible that a suitable mobile communication service is not provided to the mobile station in the serving cell which continues serving or in the neighboring cell to be transferred to. Accordingly, quality of service for the user is degraded.

Namely, it can be said that more accurate measurement is required for a cell reselection or handover.

Further, during a waiting state, a mobile station determines whether it is served based on received power or received quality of a serving cell, in addition to measurement for a cell reselection. For example, a mobile station compares received power or received quality of a signal from a serving cell with a predetermined threshold value. When the received power or the received quality of the signal from the serving cell is less than or equal to the predetermined value, the mobile station determines that it is out of a serving area. For other cases, the mobile station determines that it is within the serving area.

The predetermined threshold value may be reported by signaling from a network, i.e., a radio base station. For example, in a Long Term Evolution (LTE) scheme, the predetermined threshold value is called as "Qrxlevmin" or "Qqualmin."

Here, when the mobile station determines that it is out of the coverage area, despite that it is within the coverage area, it is possible that a mobile communication service is not provided to the mobile station in an area in which the mobile communication service can be provided. Because of this, the quality of service is degraded for the user.

Conversely, when the mobile station determines that it is within the serving area, despite that it is out of the serving area, namely, when the mobile station determines that it is within the serving area, even though radio quality is so poor that communication may not be executed, it is possible that a user may not recognize that the user himself/herself is out of the serving area. For the service quality, it is not preferable to determine that it is within the serving area, despite that it is out of the serving area.

Namely, for the determination of whether it is within the serving area or out of the serving area, it is necessary to accurately measure the received power or the received quality. In other words, when a measured result of the received power or the received quality is not accurate, degradation of the service quality is caused.

Measurement of received power or received quality in a mobile station is not particularly specified. Namely, a measurement bandwidth or a measurement interval (a measurement time period) for measuring received power or received quality depends on implementation.

An LTE mobile communication system is explained. An LTE mobile communication system is a mobile communication system that is a successor of W-CDMA (Wideband Code Division Multiple Access) and HSDPA (High Speed Downlink Packet Access).

In LTE, downlink reference signals to be measured by a mobile station are arranged while they are distributed both in a frequency axis direction and in a time axis direction (cf. Non-Patent Document 2, for example). The mobile station can suitably set a measurement bandwidth or a measurement interval for measuring the received power or the received quality, provided that it is within a range in which certain accuracy is satisfied.

Next, the LTE mobile communication system is explained.

FIG. 1 shows an example of system bandwidths.

In the LTE mobile communication system, a variable system bandwidth from 6 resource blocks (Resource Block: RB) to 100 resource blocks may be used, depending on a capability of an evolved Node B (eNodeB) and user equipment. For example, a system bandwidth of 6 resource blocks may be used, a system bandwidth of 50 resource blocks may be used, or a system bandwidth of 100 resource blocks may be used. A resource block is a single transmission unit in a frequency direction. A frequency bandwidth of one resource block is 180 kHz (cf. Non-Patent Documents 3 and 4, for example). In LTE, the system bandwidth is also called "Channel Bandwidth."

RELATED ART DOCUMENT

Non-Patent Document

[NON-PATENT DOCUMENT 1] 3GPP TS36.214 V10.1.0 2011-03
[NON-PATENT DOCUMENT 2] 3GPP TS36.211 V10.3.0 2011-09

[NON-PATENT DOCUMENT 3] 3GPP TS36.101 V10.4.0 2011-09
[NON-PATENT DOCUMENT 4] 3GPP TS36.104 V10.4.0 2011-09
[NON-PATENT DOCUMENT 5] 3GPP TS36.213 V10.3.0 2011-09

SUMMARY OF THE INVENTION

Problem to be Solved by the Invention

An object of the present invention is to improve reliability on a measurement result of interference from another cell.

Means for Solving the Problem

According to one example of the present invention, there is provided a mobile station including a parameter retrieval unit that retrieves information representing a first carrier frequency of a serving cell and a second carrier frequency of a neighboring cell from a radio base station; a frequency band setting unit that sets a frequency band for measuring radio quality of the serving cell and the neighboring cell, based on the retrieved information; and a measurement unit that measures the radio quality of the serving cell and the neighboring cell, based on the set frequency band.

According to another example, there is provided a communication method of a mobile station including a parameter retrieval step of retrieving information indicating carrier frequencies of a serving cell and a neighboring cell from a base station; a frequency band setting step of setting a frequency band of measuring radio quality of the serving cell and the neighboring cell based on the retrieved information; and a measurement step of measuring radio quality of the serving cell and the neighboring cell, based on the set frequency band.

Effect of the Present Invention

According to a disclosed embodiment, it is possible to improve reliability on a measurement result of interference from another cell.

EMBODIMENTS FOR CARRYING OUT THE INVENTION

In an LTE mobile communication system, downlink reference signals (Reference Signal) to be measured by a mobile station are arranged such that they are distributed both in a frequency axis direction and in a time axis direction. In the LTE mobile communication system, a frequency band to be measured, a frequency bandwidth to be measured, and an interval to be measured can be suitably set, provided that certain measurement accuracy is satisfied.

Figure 1:
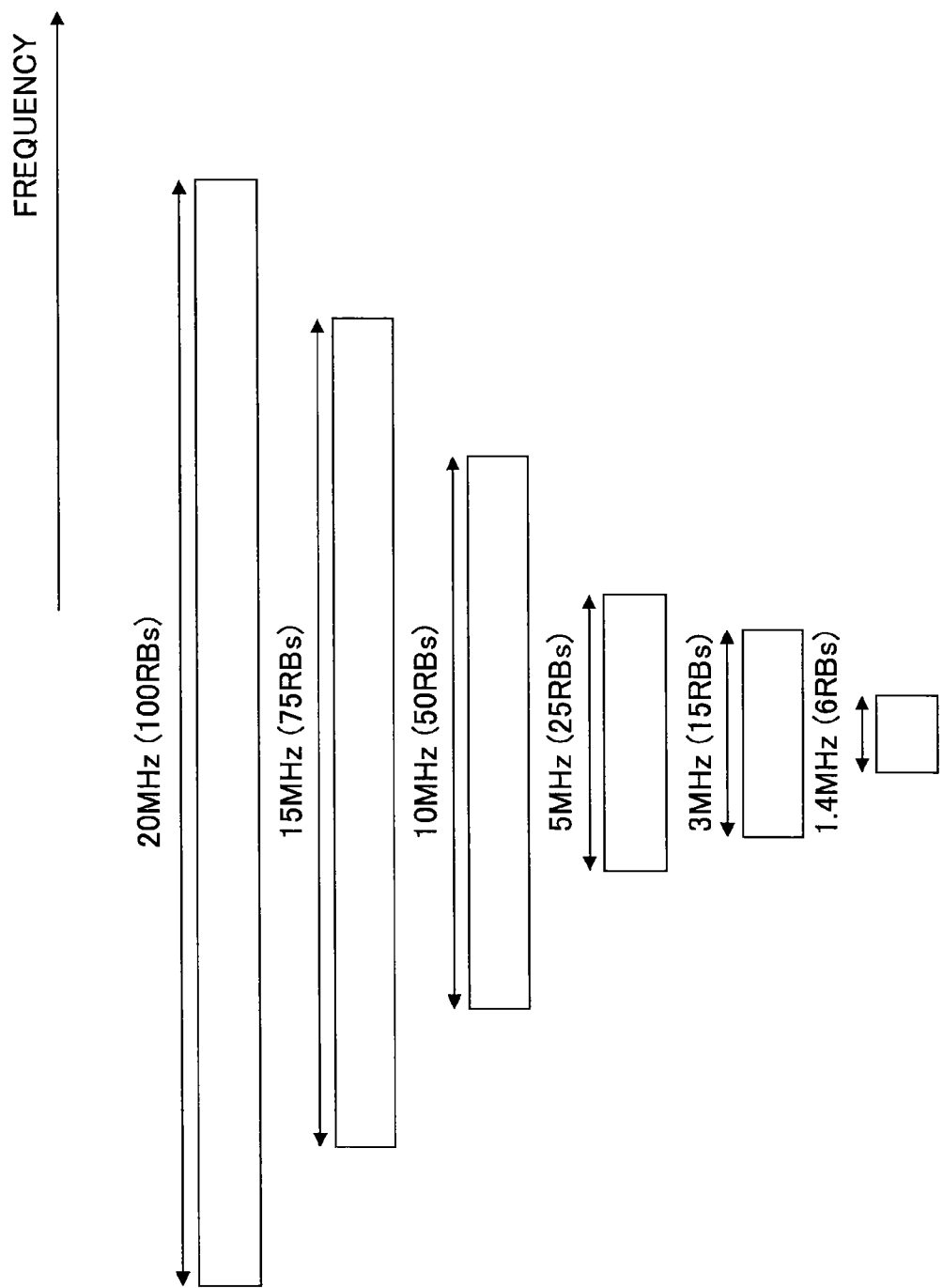
FIG. 1 is a diagram showing an example of a variable system bandwidth.
Figure 2:
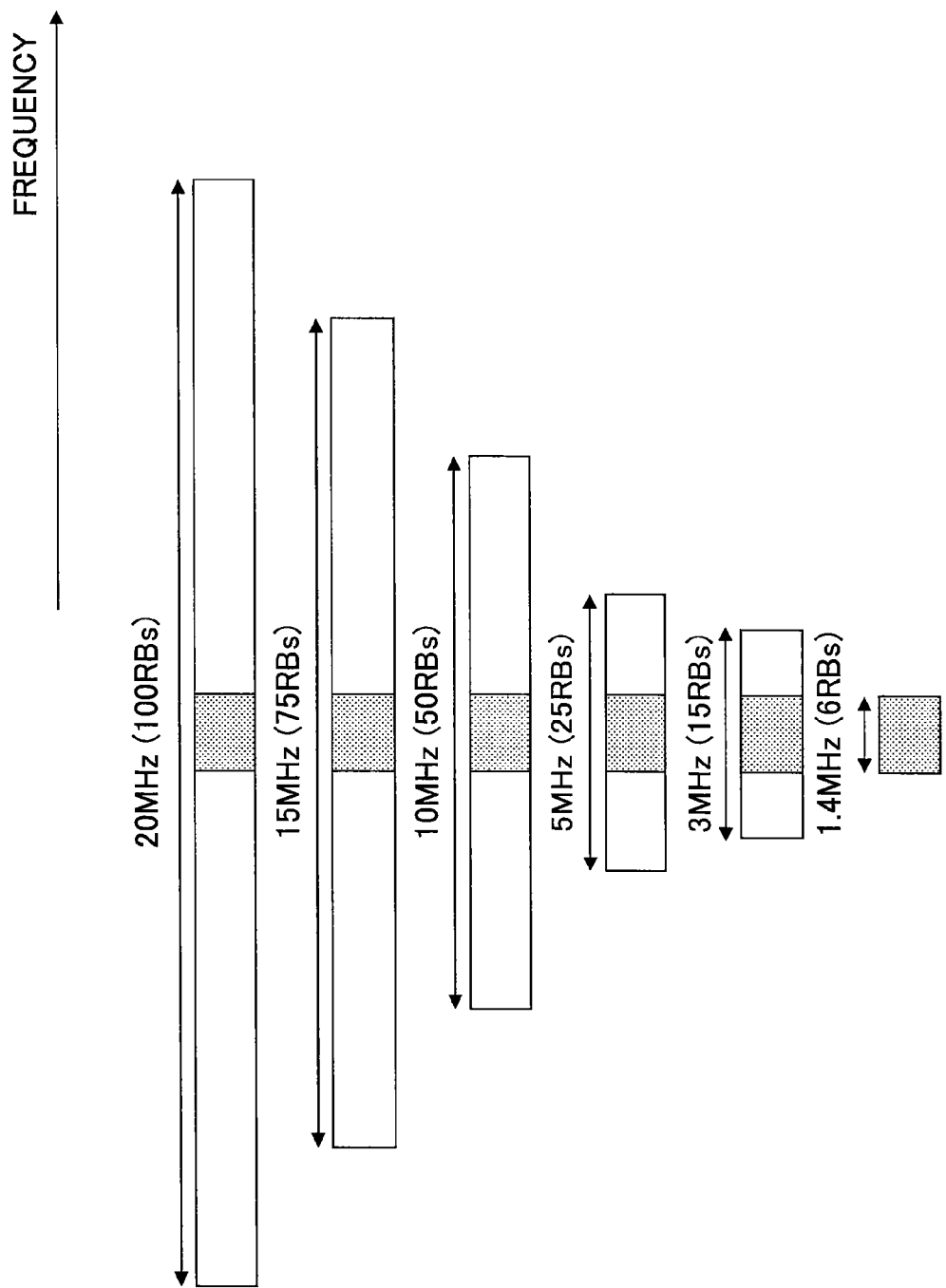
FIG. 2 is a diagram showing a measurement band.

FIG. 2 shows a frequency band with which a synchronization channel and a physical broadcast channel are transmitted.

In LTE, which has a variable frequency system bandwidth from 1.4 MHz to 20 MHz, the synchronization channel (Synchronization Channel) and the physical broadcast channel (Physical Broadcast Channel) are transmitted by six resource blocks at a center of the system band. In other words, the six resource blocks at the center are always transmitted, irrespective of the system bandwidth.

Accordingly, in the LTE mobile communication system, in general, the mobile station measures the six resource blocks at the center of the system bandwidth. Namely, even if an own cell and a neighboring cell correspond to the system bandwidth of 100 resource blocks, the six resource blocks at the center are measured.

The mobile station attempts to measure radio quality of the serving cell and the neighboring cell in a bandwidth, which is as narrow as possible. The mobile station measures radio quality in the serving cell and in the neighboring cell in an interval, which is as small as possible. These are for obtaining a processing load reduction effect and a battery saving effect.

In general, the measurement accuracy increases, as the bandwidth to be measured becomes greater. In general, the measurement accuracy increases, as the interval to be measured becomes longer. However, there is a limit for improving the measurement accuracy. Thus, for example, the mobile station may perform measurement of the radio quality by using a signal of a predetermined frequency band, which is centered on a carrier frequency. The predetermined frequency band is narrower than the system bandwidth.

However, when the measurement bandwidth is limited, for example, to the six blocks at the center of the system bandwidth, it is possible that an amount of interference from another cell is not suitably measured. Especially, it is prominent in an environment, in which radio quality within a system bandwidth depends on a frequency band. As a result that an amount of interference from another cell is not suitably measured, it is possible that radio quality is not suitably measured, and the measurement accuracy is lowered.

Figure 3:
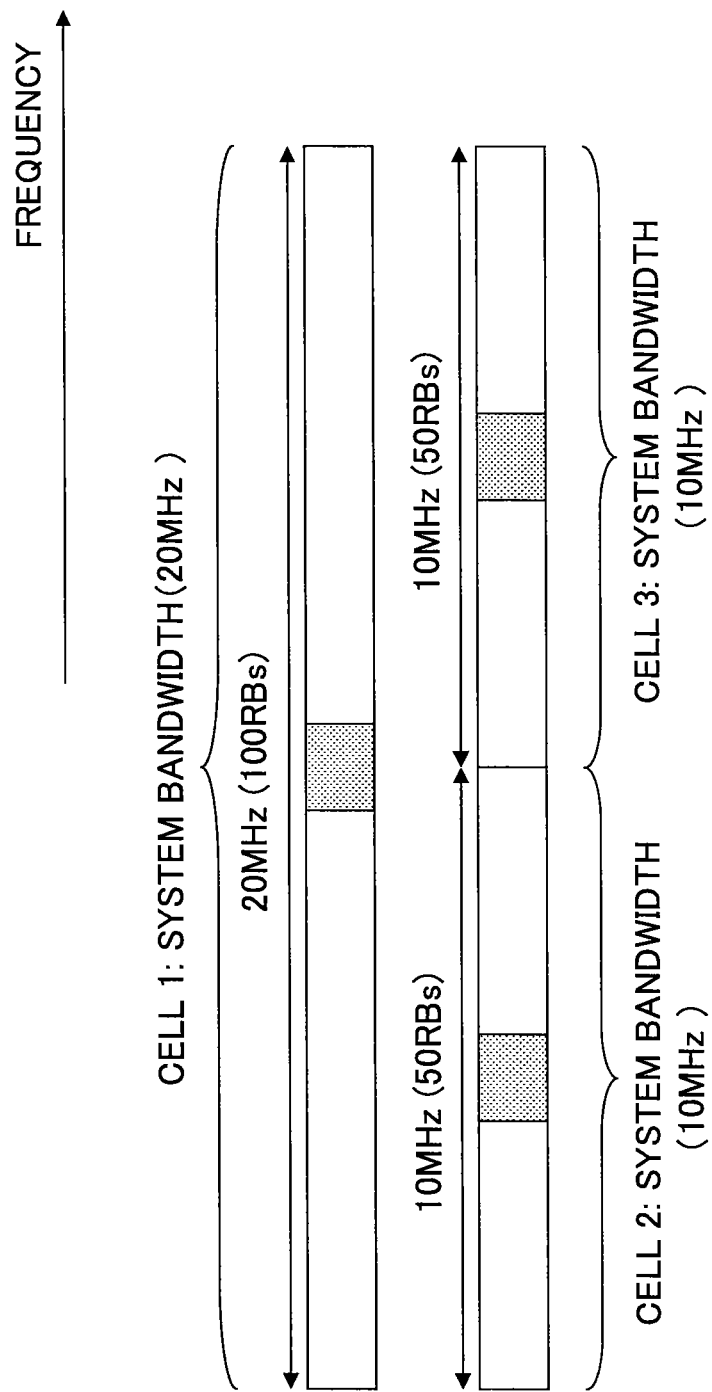
FIG. 3 is a diagram showing a frequency relationship (version 1) among cells of different system bandwidths.
Figure 4:
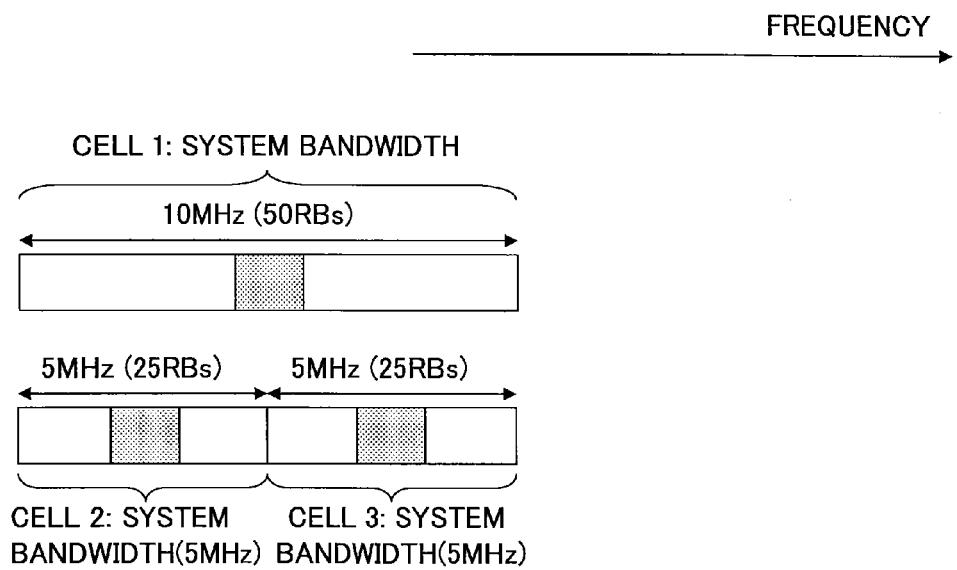
FIG. 4 is a diagram showing a frequency relationship (version 2) among the cells of the different system bandwidths.

FIGS. 3 and 4 show an example of carrier frequencies which are set for corresponding neighboring cells. In FIGS. 3 and 4, the horizontal axis represents a frequency.

In the relationship between a serving cell and a neighboring cell, it is possible that carrier frequencies are different, but at least portions of the corresponding system bands overlap.

In the example shown in FIG. 3, the system bandwidth of the cell 1 is 20 MHz (100 RBs), the system bandwidth of the cell 2 is 10 MHz (50 RBs), and the system bandwidth of the cell 3 is 10 MHz (50 RBs). The carrier frequency of the cell 2 is included in a carrier frequency of the cell 1. The carrier frequency of the cell 3 is included in a carrier frequency of the cell 1. In the example shown in FIG. 3, the system band of the cell 2 and the system band of cell 3 do not overlap. The cell 1 may be the serving cell, and the cell 2 and the cell 3 may be the neighboring cells. Alternatively, the cell 2 may be the serving cell, and the cell 1 and the cell 3 may be the neighboring cells. Alternatively, the cell 3 may be the serving cell, and the cell 1 and the cell 2 may be the neighboring cells.

In the example shown in FIG. 4, the system bandwidth of the cell 1 is 10 MHz (50 RBs), the system bandwidth of the cell 2 is 5 MHz (25 RBs), and the system bandwidth of the cell 3 is 5 MHz (25 RBs). The system band of the cell 2 is included in a portion of a system band of the cell 1. Further, the system band of the cell 3 is included in a portion of the system band of the cell 1. In the example shown in FIG. 4, the system band of the cell 2 and the system band of the cell 3 do not overlap. The cell 1 may be the serving cell, and the cells 2 and 3 may be the neighboring cells. The cell 2 may be the serving cell, and the cells 1 and 3 may be the neighboring cells. Alternatively, the cell 3 may be the serving cell, and the cells 1 and 2 may be the neighboring cells.

In the examples shown in FIGS. 3 and 4, a peripheral band of the carrier frequency of the cell 1 is arranged at a position between the system band of the cell 2 and the system band of the cell 3, and radio quality of the position is different from that of a frequency band, where the system bands overlap.

In this case, if the measurement is executed in a specific bandwidth (e.g., the six resource blocks) at the center of the system bandwidth (especially, if the measurement requires measurement of power from a neighboring cell, such as RSRQ measurement), degradation in the measurement accuracy may occur. Namely, proper measurement may not be executed.

A specific example is explained.

Figure 5:
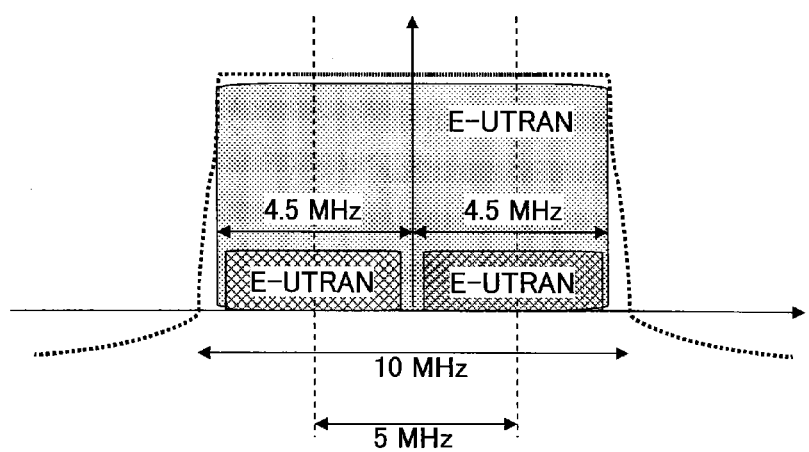
FIG. 5 is a diagram showing a signal relationship among the cells of the different system bandwidths.

FIG. 5 shows an example in which degradation of measurement accuracy occurs.

In the example shown in FIG. 5, the bandwidth of the serving cell is 10 MHz, and the bandwidth of each of the neighboring cells is 5 MHz. The system band of the serving cell includes the system bands of the two neighboring cells. The system bands of the two neighboring cells do not overlap.

Due to an arrangement relationship among the carrier frequency of the serving cell, the carrier frequencies of the neighboring cells, and signals of the corresponding cells, in the specific band (which is the vicinity of the carrier frequency of the serving cell of the 10 MHz, in this case), interference which is caused by signals from the corresponding neighboring cells of 5 MHz may be observed to be small. That is because a frequency band exists at least in a part of the measurement band of the serving cell, which frequency band is not used for communication by the neighboring cells. Namely, in the frequency band which is not utilized for the communication, the interference from the neighboring cells may be observed to be small.

The embodiment is explained, based on the figures. In all the figures for explaining the embodiment, the same symbol is attached to entities having the same function, and thereby repeated explanations are omitted.

Embodiment

Mobile Communication System

Figure 6:
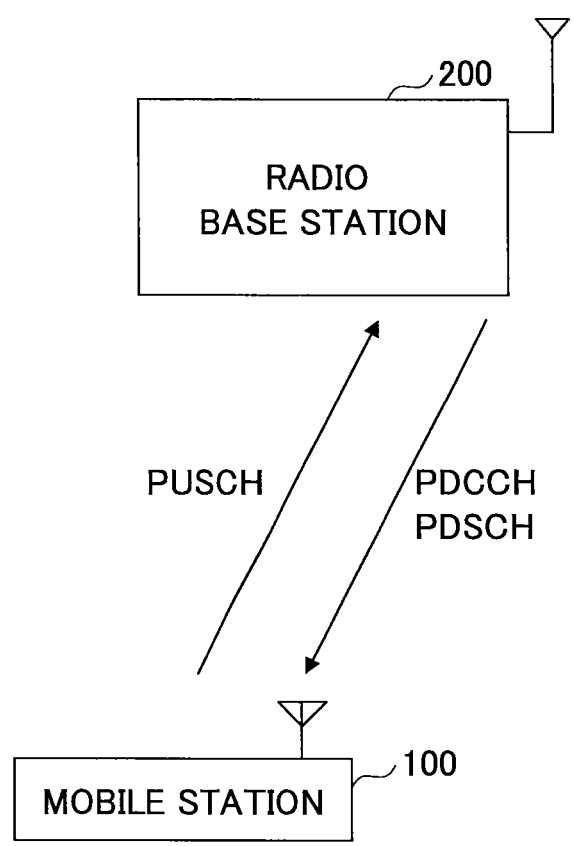
FIG. 6 is a diagram showing an example of a mobile communication system.

FIG. 6 shows an example of the mobile communication system.

The example of the mobile communication system includes a mobile station (User Equipment: UE) 100 and a radio base station (eNodeB: eNB) 200.

In the example of the mobile communication system, an LTE mobile communication system is explained. It is not limited to the LTE mobile communication system, and it can be applied to another mobile communication system. For example, it can be applied to an LTE-Advanced mobile communication system.

In the example of the mobile communication system, an "Orthogonal Frequency Division Multiplexing (OFDM) method" is applied for a downlink, and a "Single-Carrier Frequency Division Multiple Access (SC-FDMA) method" is applied for an uplink, as a radio access method.

The OFDM method is a method such that a specific frequency band is divided into a plurality of narrow frequency bands, and transmission is executed by putting data on corresponding frequency bands. The narrow frequency band is also called a "sub-carrier." According to the OFDM method, high speed transmission can be achieved and a frequency utilization efficiency can be increased by densely arranging sub-carriers on a frequency axis in such a way that the sub-carriers partially overlap, but the sub-carriers do not interfere with each other.

In the SC-FDMA method, a specific frequency band is divided, and transmission is executed, while using different frequency bands among a plurality of mobile stations 100. By executing transmission while using the different frequency bands among the plurality of mobile stations 100, interference among the plurality of mobile stations 100 can be reduced. Since the SC-FDMA method has a characteristic such that variation of transmission power is small, power consumption reduction of the mobile station 100 can be achieved, and broader coverage can be achieved.

The radio base station 200 transmits a downlink control signal through a physical downlink control channel (PDCCH). Further, the radio base station 200 transmits a downlink data signal through a physical downlink shared channel (PDSCH).

The mobile station 100 transmits an uplink data signal through a physical uplink shared channel (PUSCH).

Mobile Station 100

Figure 7:
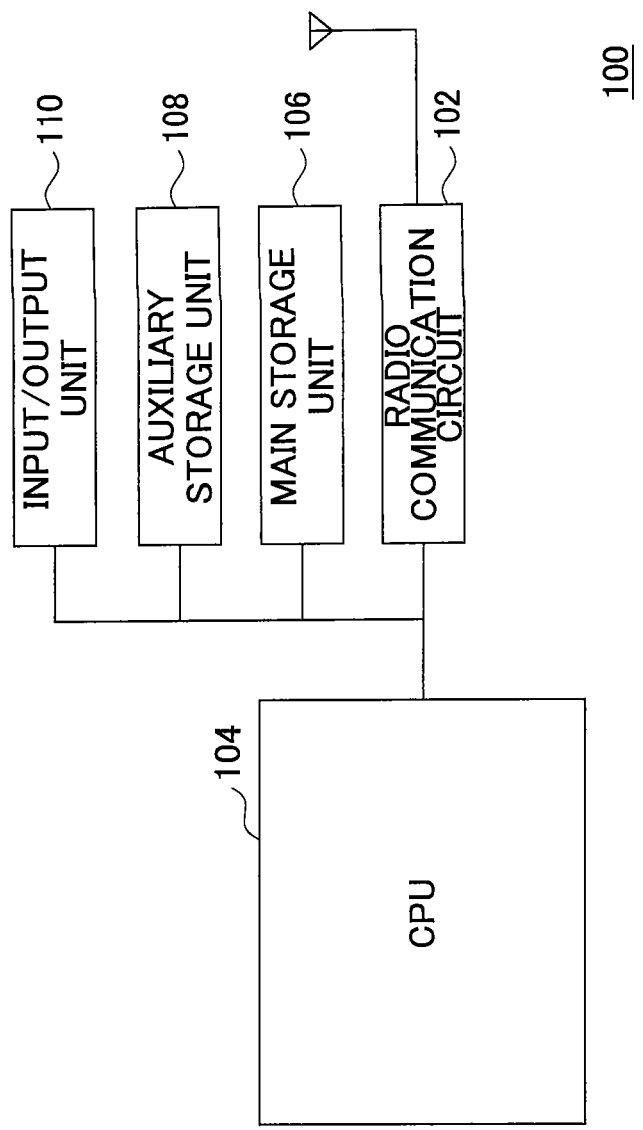
FIG. 7 is a diagram showing an example of a mobile station.

FIG. 7 shows an example of the mobile station 100. FIG. 7 mainly shows a hardware configuration.

The mobile station 100 may be any suitable terminal with which a user can perform communication. For example, it includes a user terminal such as a mobile phone, an information terminal, a personal digital assistant, a mobile personal computer, a smart phone, or the like. However, the mobile station 100 is not limited to these.

The mobile station 100 includes a radio communication circuit 102; a CPU 104; a main storage unit 106; an auxiliary storage unit 108; and an input/output unit 110. The auxiliary storage unit 108 may be included in a Universal Subscriber Identity Module (USIM) card.

The radio communication circuit 102 performs radio communication with the radio base station 200.

The CPU 104 executes control of the radio communication circuit 102; the main storage unit 106; the auxiliary storage unit 108; and the input/output unit 110. The CPU 104 functions in accordance with a program which is stored in the main storage unit 106, and the CPU 104 executes a predetermined process.

The main storage unit 106 includes an application and an operating system (OS). The application is software including a function that executes a task, which is executed by a user on the mobile station 100. The OS is software that provides, in the mobile station 100, an interface which abstracts hardware to application software.

The input/output unit 110 includes, for example, a keyboard and a mouse. It is a device for inputting a command or data to the mobile station. The input/output unit 110 may be formed of a touch panel. The input/output unit 110 may be formed of a microphone, for example, and it may input voice, which is pronounced by a user. The voice may include a message to a recipient, or a command to the mobile station 100. The command includes that for the OS, or that for the application.

The input/output unit 110 may be formed of a display, for example, and it displays a processing state or a processed result of the mobile station 100. Further, the input/output unit 110 may be formed of a speaker, for example, and it may output sound to a user. The processing state or the processed state includes that by the OS or that by the application. The display includes a liquid crystal display (LCD), a cathode ray tube (CRT) display, a plasma display panel (PDP); an organic electro-luminescence (EL) display, or the like.

Functions of the Mobile Station 100

An example of functions of the mobile station 100 is explained.

Figure 8:
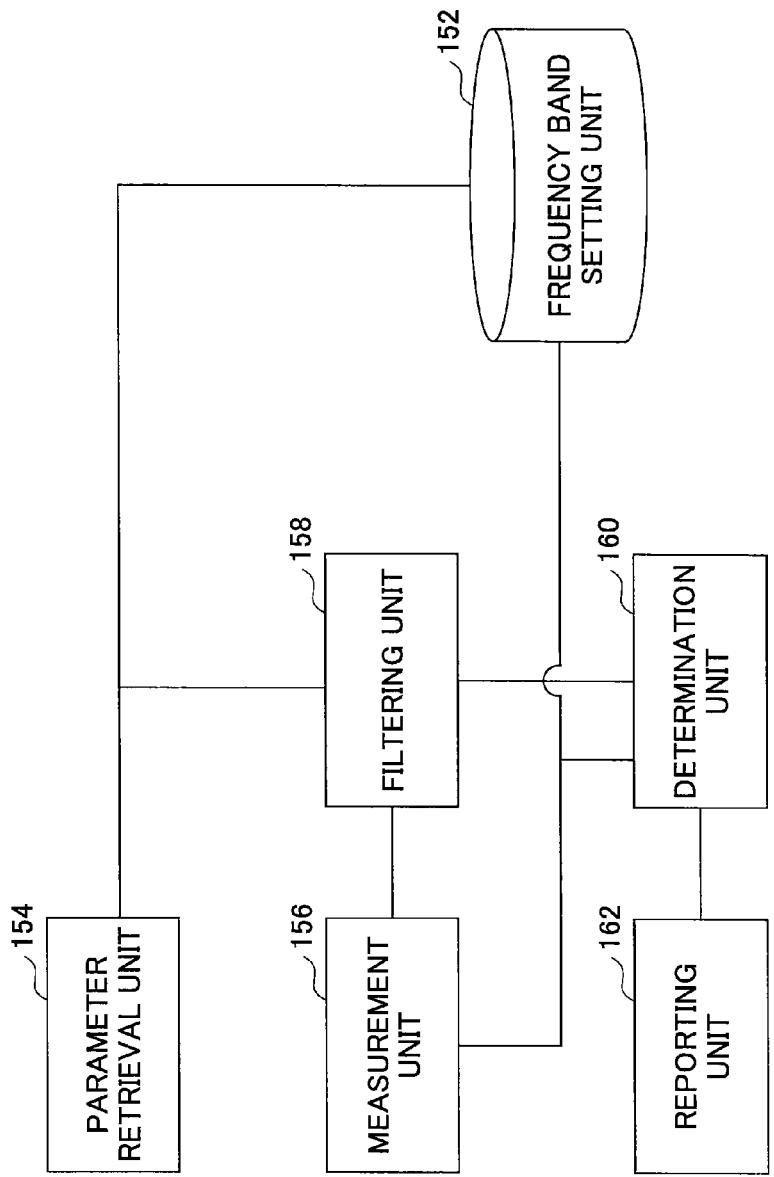
FIG. 8 is a functional block diagram showing the example of the mobile station.

FIG. 8 is a functional block diagram showing the example of the functions of the mobile station 100. The functions represented by the functional block diagram are mainly executed by the CPU 104. Namely, the functions represented by the functional block diagram are executed by the CPU 104 in accordance with the application, which is stored in the main storage unit 106. The functions represented by the functional block diagram of FIG. 8 may be executed by the CPU 104 in accordance with an application (firmware), which is stored in a built-in memory of the CPU 104.

The CPU 104 functions as a frequency band setting unit 152; a parameter retrieval unit 154; a measurement unit 156; a filtering unit 158; a determination unit 160; and a reporting unit 162.

The frequency band setting unit 152 sets a frequency band to be measured, based on a carrier frequency which is reported from the parameter retrieval unit 154. The frequency band setting unit 152 also reports a modified measurement condition (which is referred to as the "modified condition," hereinafter) or a threshold value which is modified (which is referred to as the "modified threshold value," hereinafter) to the measurement unit 156.

The measurement condition includes a frequency band of a target of the measurement, for example.

The modified condition includes a carrier frequency of a serving cell, and a carrier frequency of a neighboring cell. The neighboring cell includes an adjacent cell, which is adjacent to the serving cell. Specifically, the modified condition may be a condition as to whether the carrier frequency of the neighboring cell exists within a system band of the serving cell. Alternatively, the modified condition may be a condition as to whether the carrier frequency of the neighboring cell exists within a certain frequency range from an end of the system band of the serving cell, and as to whether the system bands overlap each other.

The parameter retrieval unit 154 retrieves a parameter which is related to Mobility Control from the radio base station 200. The parameter related to the Mobility Control may include, for example, an "E-UTRAN Absolute Radio Frequency Channel Number (EARFCN)," which is a carrier frequency of a neighboring cell; and a "Qrxlevmin," which is a predetermined threshold value used for the determination as to whether it is served. The "EARFCN" is an absolute value, which uniquely indicates a carrier frequency of each of cells. The "Qrxlevmin" is a minimum required received level (dBm) in the cell.

Further, the parameter related to the Mobility Control may include "Qhyst," "Qoffset," and "Treselection," which are parameters related to a cell reselection; "Time-to-trigger," a hysteresis, an offset, and a filter coefficient, which are parameters related to handover control; and the like.

The "Qhyst" is a plus offset which is added to radio quality of the serving cell during the determination of the cell reselection. The "Qoffset" is a minus offset which is added to the radio quality of the serving cell during the determination of the cell reselection. The "Treselection" is a hysteresis in a time direction which is utilized during the determination of the cell reselection. The "Treselection" is a parameter corresponding to "Time-to-trigger" for handover.

The parameter retrieval unit 154 reports the filter coefficient to the filtering unit 158.

The measurement unit 156 measures radio quality of the serving cell and the neighboring cell. Specifically, the measurement unit 156 measures received power of signals from the serving cell and the neighboring cell, as the radio quality of the serving cell and the neighboring cell. The signals from the serving cell and the neighboring cell include the reference signal (RS), for example. The received power of the reference signal may be called "Reference Signal Received Power (RSRP)."

The measurement unit 156 may also measure a relative ratio between received power of signals from the serving cell and the neighboring cell (e.g., the reference signals) and total received power in a frequency band of the signals from the serving cell and the neighboring cell, as the radio quality of the serving cell and the neighboring cell. The received power of the reference signals may be called the "RSRP." The total received power may be called the "Received Signal Strength Indicator (RSSI)." The received quality, which is the relative ratio, may be called "Reference Signal Received Quality (RSRQ)."

For example, a measurement interval (Measurement period) in a physical layer is 200 ms. Here, the interval, which is actually used for measurement within 200 ms, may be 1 ms, provided that the measurement accuracy can be ensured.

The measurement bandwidth in the frequency axis direction may also be narrower than the system bandwidth, provided that certain measurement accuracy can be satisfied.

The measurement unit 156 reports a measurement result of the radio quality of the serving cell of the mobile station 100 and that of the neighboring cell to the filtering unit 158.

The measurement unit 156 changes a measurement condition, such as the frequency band to be measured, for example, based on the modified condition or the modified threshold value, which is reported from the frequency band setting unit 152. Here, the frequency bandwidth of the frequency band to be measured may be defined, for example, to be a multiple of a collection of sub-carriers, which are defined in the LTE mobile communication system, and which are referred to as "RBs." Further, the measurement interval (measurement time period) may be defined to be a multiple of successive OFDM symbols, which are referred to as the "sub-frame."

The measurement unit 156 also measures the radio quality (e.g., the RSRP or the RSRQ) of the serving cell and the neighboring cell of the mobile station 100 at every Discontinuous Reception (DRX) period.

A measurement result of the radio quality of the serving cell and the neighboring cell of the mobile station is input from the measurement unit 156 to the filtering unit 158.

A filtering coefficient (predetermined coefficient) is also input from the parameter retrieval unit 154 to the filtering unit 158. The filtering unit 158 calculates a filtering result based on the measurement result of the radio quality of the serving cell and the neighboring cell of the mobile station 100, and the filtering coefficient. Namely, in the mobile station 100, an upper layer executes a filtering process (L3 Filtering) with respect to the value, which is measured by the physical layer.

Specifically, an index with respect to measurement timing is denoted by "m," a measurement result after filtering is denoted by "$F_m$," the filter coefficient is denoted by "k," a measurement result after filtering in previous measurement timing is denoted by "$F_{m-1}$," and the measurement result is denoted by "$M_m$." The value of the filter coefficient "k" may be reported from the radio base station 200 to the mobile station 100 in advance.

The filtering unit 158 executes filtering by the expression (1) and the expression (2).

$$F_m = (1-a) \cdot F_{m-1} + a \cdot M_m \quad (1)$$

$$a = 1/2^{(k/4)} \quad (2)$$

Here, the filter coefficient may be denoted by "a."

During filtering, when the measurement result after filtering "$F_m$" is calculated, contribution ratios of the latest measurement result "$M_m$" at the measurement unit 156 and the previous measurement result after filtering "$F_{m-1}$" may be adjusted by adjusting the filter coefficient "a."

The filtering unit 158 inputs the filtered measurement result to the determination unit 160.

The filtered measurement result is input from the filtering unit 158 to the determination unit 160. The measurement result, which is not filtered, is also input from the measurement unit 156 to the determination unit 160.

The determination unit 160 determines whether it is served or not by using the measurement result of the radio quality from the measurement unit 156. Namely, the determination unit 160 makes the determination as to whether it is served. Specifically, in a waiting state (Idle mode), the determination unit 160 may determine whether it is served, based on the measurement result from the measurement unit 156.

The determination unit 160 may also determine as to whether the cell reselection is to be performed, by using the measurement result of the radio quality from the measurement unit 156. Specifically, when a predetermined condition is satisfied for more than or equal to a predetermined time period, the determination unit 160 may determine to perform the cell reselection.

Here, the determination unit 160 may define the predetermined condition to be a condition in which the expression (3) is satisfied. The predetermined time period may also be called the "Treselection."

(Received power of the signal from the neighboring cell)+(Qhyst)>(Received power of the signal from the serving cell) (3)

The determination unit 160 may determine as to whether the filtered measurement result from the filtering unit 158 is to be reported. Specifically, when the predetermined condition is continuously satisfied for more than or equal to the predetermined time period, the determination unit 160 may determine to report the filtered measurement result from the filtering unit 158.

Here, the determination unit 160 may define the predetermined condition to be a condition in which the expression (4) is satisfied. The predetermined time period may also be called the "Time-to-trigger." In the expression (4), the "hysteresis" may be set in advance.

(Received power of the signal from the neighboring cell)+(hysteresis)>(Received power of the signal from the serving cell) (4)

The determination unit 160 inputs a determination result to the reporting unit 162. When the determination result from the determination unit 160 indicates that the measured result is to be reported, the reporting unit 162 reports the measured result to the radio base station 200. Specifically, the reporting unit 162 reports the measurement result through the PUSCH. Namely, the reporting unit 162 transmits the PUSCH which includes the measurement result. The measurement result may be called the "Measurement Report."

Operation of the Mobile Communication System
(Version 1)

Figure 9:
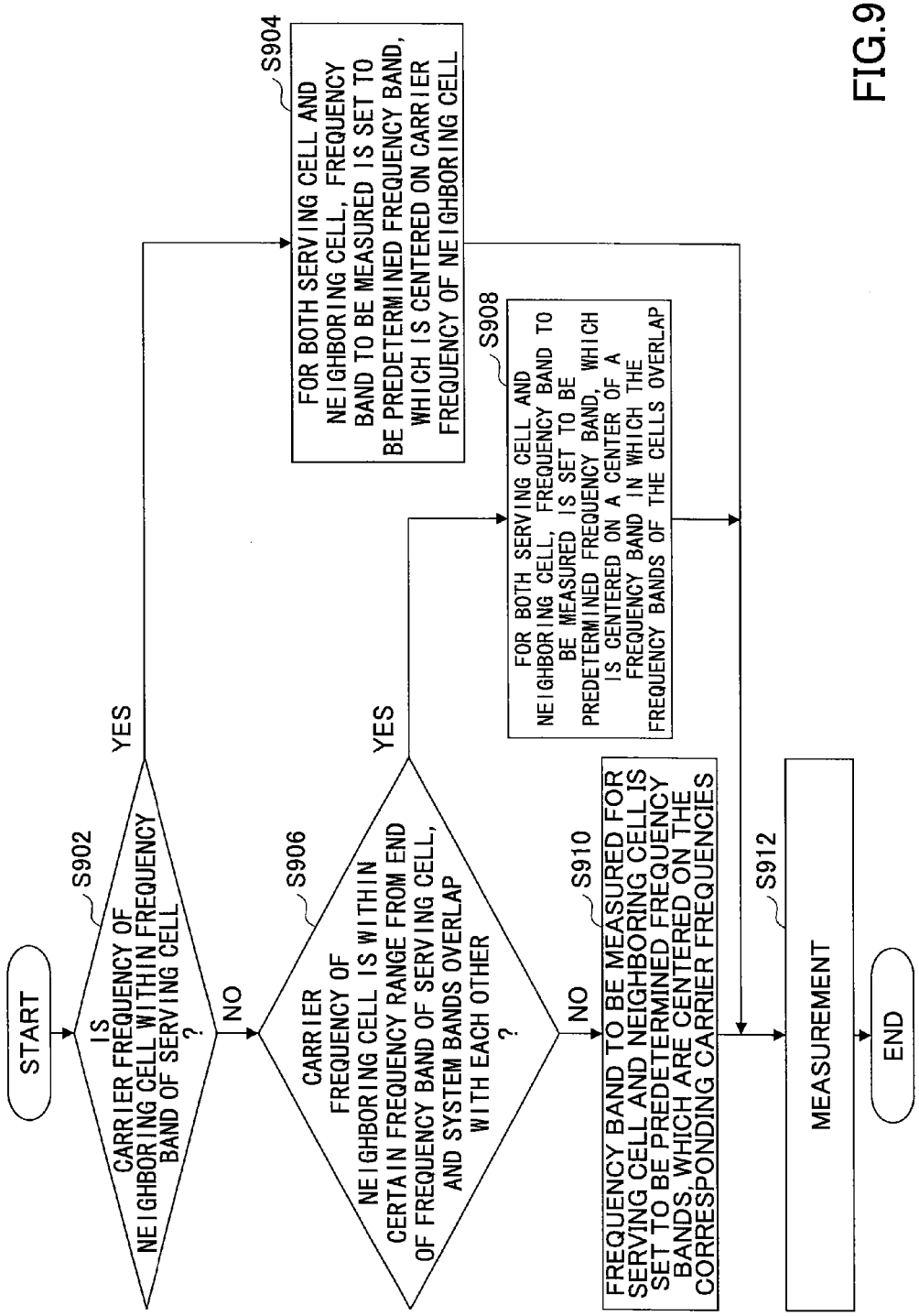
FIG. 9 is a flowchart showing an example of an operation of the mobile station.

FIG. 9 shows an example of operation of the mobile communication system. Specifically, there is shown the operation during execution of the measurement of the radio quality by the mobile station 100.

At step S902, the frequency band setting unit 152 determines frequency positions of the carrier frequencies of the serving cell and the neighboring cell. Specifically, the frequency band setting unit 152 determines the frequency positions of the carrier frequencies of the serving cell and the neighboring cell, based on the carrier frequencies from the parameter retrieval unit 154. The frequency band setting unit 152 determines whether the carrier frequency of the neighboring cell is within the system band.

Figure 10:
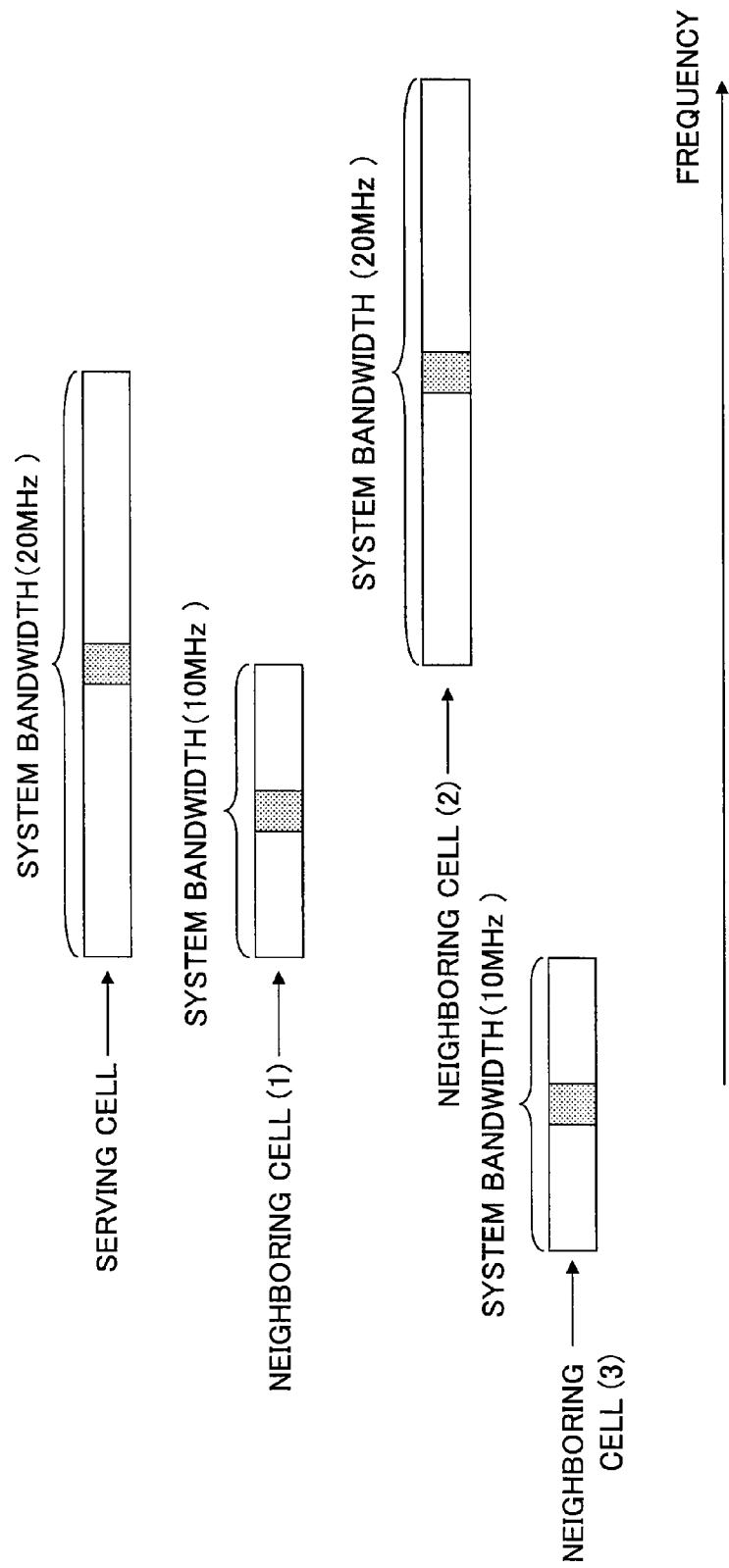
FIG. 10 is a diagram showing a relationship between a frequency band of a serving cell and a frequency band of a neighboring cell.

FIG. 10 shows an example of the relationship between the serving cell and the neighboring cells.

In the example shown in FIG. 10, the system bandwidth of the serving cell is 20 MHz; the system bandwidth of the neighboring cell (1) is 10 MHz; the system bandwidth of the neighboring cell (2) is 20 MHz; and the system bandwidth of the neighboring cell (3) is 10 MHz. The carrier frequency of the neighboring cell (1) is determined to be within the system band of the serving cell. Since the carrier frequencies of the neighboring cells (2) and (3) are not included in the system bandwidth of the serving cell, a determination is made that they are not within the system band of the serving cell.

At step S904, when a determination is made that the carrier frequency of the neighboring cell is within the system band of the serving cell, the frequency band setting unit 152 sets the frequency band to be measured by reporting the frequency band to be measured to the measurement unit 156. Specifically, the frequency band setting unit 152 sets, for both the serving cell and the neighboring cell of the serving cell, the frequency band, which is to be measured, to be a predetermined frequency band which is centered on the carrier frequency of the neighboring cell. Namely, in the example shown in FIG. 10, it is set to be the predetermined frequency band which is centered on the carrier frequency of the neighboring cell (1).

At step S912, the measurement unit 156 measures the radio quality of the serving cell and the neighboring cell, based on the frequency band to be measured, which is adjusted by the frequency band setting unit 152 at step S904.

At step S906, when the carrier frequency of the neighboring cell is determined not within the system band of the serving cell, the frequency band setting unit 152 determines whether the carrier frequency of the neighboring cell is within a certain range from an end of the system band of the serving cell, and whether at least a portion of the system band of the neighboring cell overlaps the system band of the serving cell.

In the example shown in FIG. 10, a determination is made for the neighboring cell (2) that the carrier frequency of the neighboring cell is within the certain range from the end of the system band of the serving cell, and that at least a portion of the system band of the neighboring cell overlaps the system band of the serving cell. For the neighboring cell (3), a determination is made that the carrier frequency of the neighboring cell is within the certain range from the end of the system band of the serving cell, and that the system band of the neighboring cell does not overlap the system band of the serving cell. That is because the carrier frequency of the serving cell and the carrier frequency of the neighboring cell (3) do not overlap.

At step S908, when a determination is made that the carrier frequency of the neighboring cell is within the certain range from the end of the system band of the serving cell, and that at least a portion of the system band of the neighboring cell overlaps the system band of the serving cell, the frequency band setting unit 152 sets the frequency band, which is to be measured, to be a predetermined frequency band which is centered on a center of a frequency band, in which both the frequency band of the serving cell and the frequency band of the neighboring cell exist. Namely, the frequency band setting unit 152 sets the frequency band to be measured for both the serving cell and the neighboring cell of the serving cell to be the predetermined frequency band, in which the frequency band of the serving cell overlaps the frequency band of the neighboring cell. Here, the predetermined frequency band is centered on the center of the carrier frequency of the serving cell.

At step S912, the measurement unit 156 measures the radio quality of the serving cell and the neighboring cell, based on the frequency band to be measured, which is set by the frequency band setting unit 152 at step S908.

At step S910, when a determination is made that the carrier frequency of the neighboring cell is not within the certain range from the end of the system band of the serving cell, or that the system band of the neighboring cell does not overlap the system band of the serving cell, the frequency band setting unit 152 sets the frequency band to be measured for the serving cell and the frequency band to be measured for the neighboring cell to be predetermined frequency bands which are centered on the corresponding carrier frequencies.

At step S912, the measurement unit 156 measures the radio quality of the serving cell and the neighboring cell, based on the frequency band to be measured, which is set by the frequency band setting unit 152 at step S910.

Operation of the Mobile Communication System (Version 2)

Figure 11:
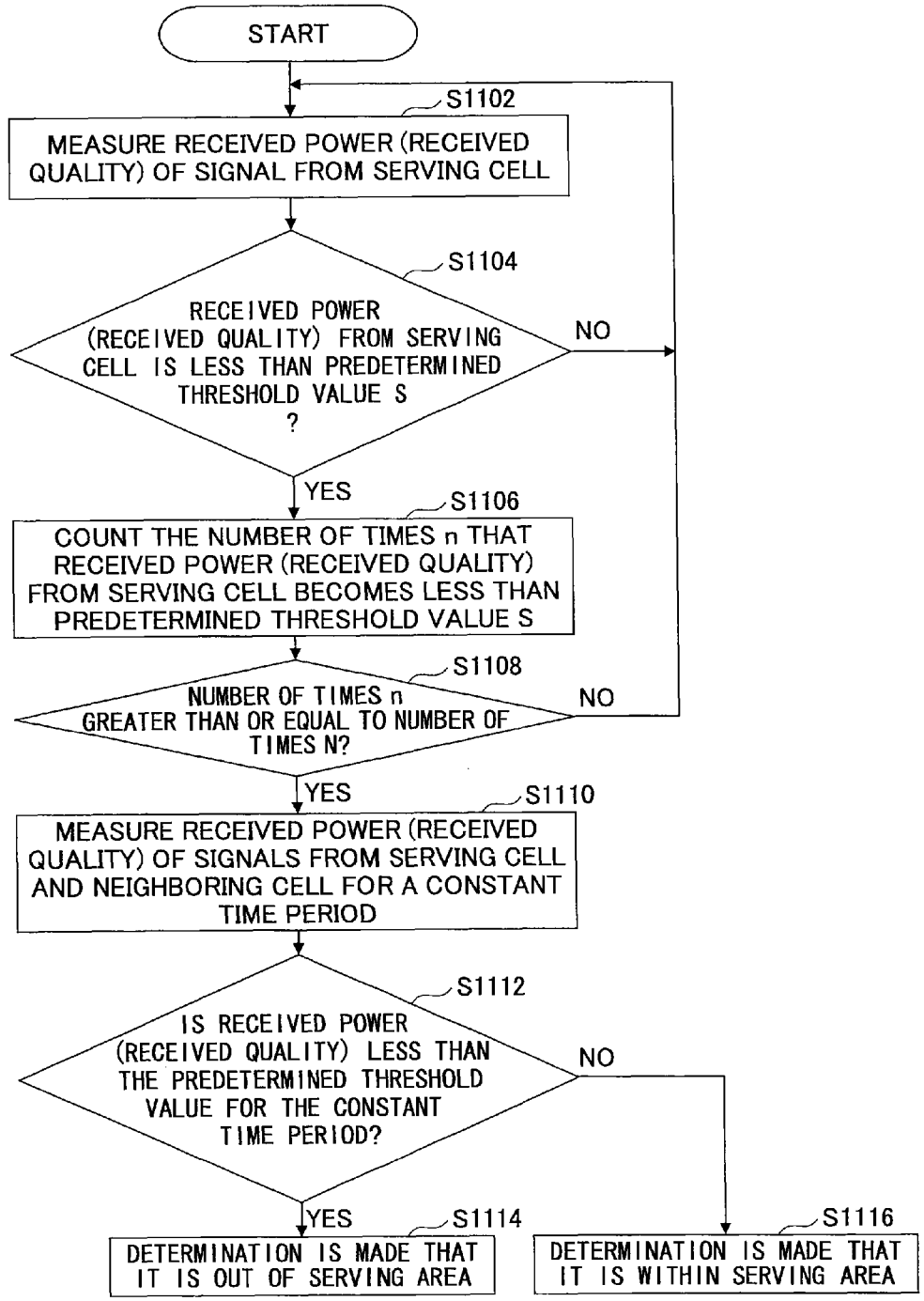
FIG. 11 is a flowchart showing an example of the operation of the mobile station.

FIG. 11 shows an example of the operation of the mobile communication system. Specifically, there is shown the operation during determination, by the mobile station 100, of whether it is served.

At step S1102, the measurement unit 156 measures at least one of the received power and the received quality of the signal from the serving cell. The measurement unit 156 inputs a measurement result of the at least one of the received power and the received quality of the signal from the serving cell to the determination unit 160. Here, the measurement unit 156 may input the modified threshold value to the determination unit 160.

At step S1104, the determination unit 160 determines whether the measurement result from the measurement unit 156 is less than a predetermined threshold value S. When the modified threshold value is input from the measurement unit 156, the determination unit 160 may determine whether the measurement result from the measurement unit 156 is less than the modified threshold value.

At step S1106, when a determination is made that the measurement result from the measurement unit 156 is less than the predetermined threshold value S, the determination unit 160 counts a number of times "n" that the measurement result becomes less than the threshold value S. The determination unit 160 may count the number of times n that the measurement result from the measurement unit 156 becomes less than the predetermined threshold value at every predetermined period, which is set in advance.

When the determination unit 160 determines that the measurement result from the measurement unit 156 is greater than or equal to the predetermined threshold value S, the process returns to step S1102.

At step S1108, the determination unit 160 determines whether the number of times n that the measurement result from the measurement unit 156 becomes less than the predetermined threshold value S is greater than or equal to a predetermined number of times N.

At step S1110, when the determination unit 160 determines that the number of the times n that the measurement result from the measurement unit 156 becomes less than the predetermined threshold value S is greater than or equal to the predetermined number of times N, the measurement unit 156 measures at least one of the received power and the received quality of the signals from the serving cell and the neighboring cell for a constant time period. Here, the constant time period may be set in advance. Specifically, it may be approximately 10 seconds.

When a determination is made that the number of times n that the measurement result from the measurement unit 156 becomes less than the predetermined threshold value S is less than the predetermined number of times N, the process returns to step S1102.

At step S1112, the determination unit 160 determines whether the at least one of the received power and the received quality of the signals from the serving cell and the neighboring cell, which is measured for the constant time period at step S1110, is less than the predetermined threshold value.

At step S1114, when a determination is made that the at least one of the received power and the received quality of the signals from the serving cell and the neighboring cell, which is measured for the constant time period, is less than the predetermined threshold value, the determination unit 160 determines that it is not served.

At step S1116, when a determination is made that the at least one of the received power and the received quality of the signals from the serving cell and the neighboring cell, which is measured for the constant time period, is greater than or equal to the predetermined threshold value, the determination unit 160 determines that it is served.

Operation of the Mobile Communication System
(Version 3)

Figure 12:
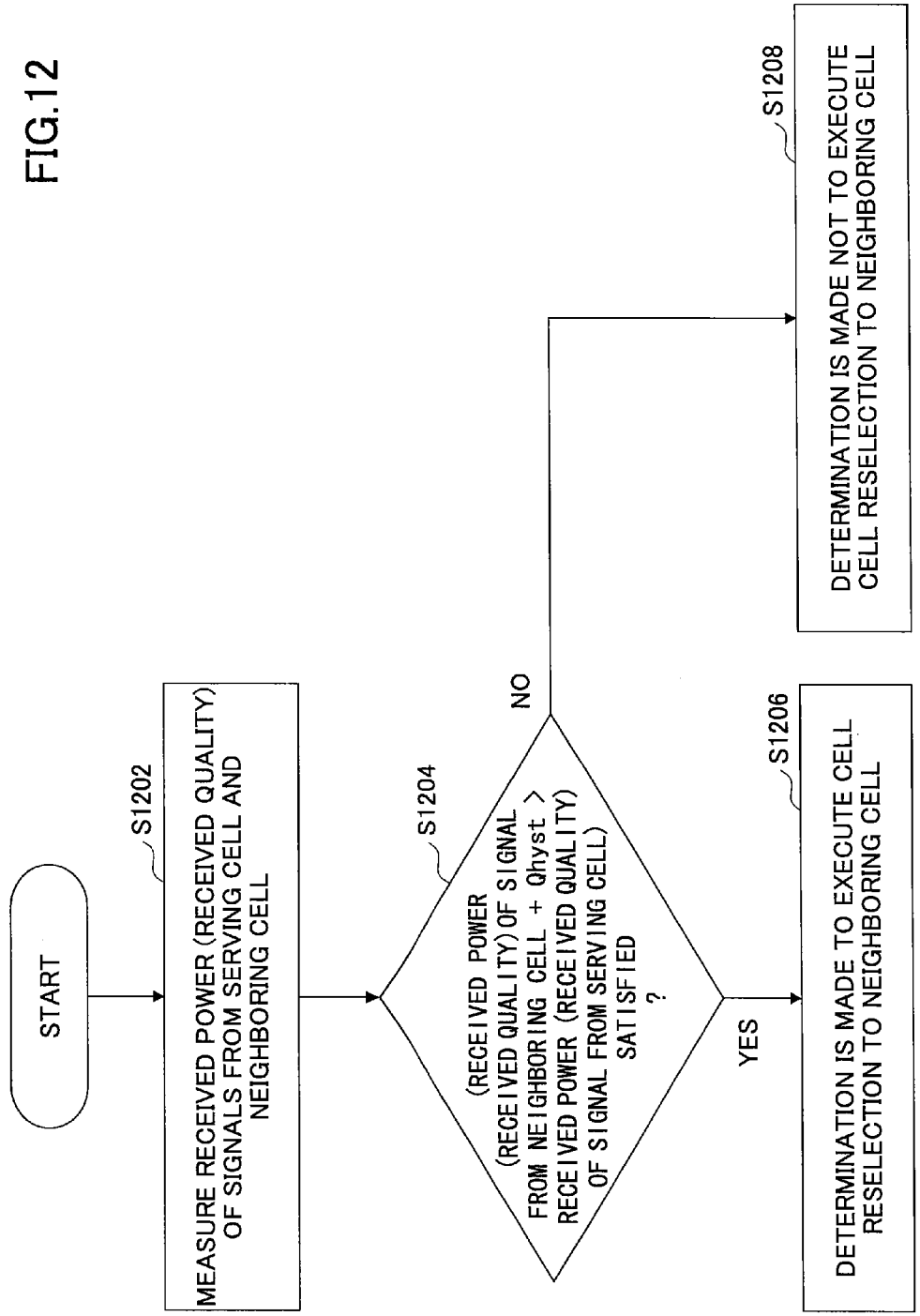
FIG. 12 is a flowchart showing an example of the operation of the mobile station.

FIG. 12 shows an example of the operation of the mobile communication system. Specifically, there is shown the operation during execution the cell reselection by the mobile station 100.

At S1202, the measurement unit 156 measured at least one of the received power and the received quality of the signals from the serving cell and the neighboring cell.

At step S1204, the determination unit 160 determines whether the above-described expression (3) is satisfied, based on the at least one from the serving cell and the neighboring cell which is measured at step S1202 by the measurement unit 156.

At step S1206, when the determination unit 160 determines that the above-described expression (3) is satisfied, the determination unit 160 determines to execute the cell reselection. Namely, the mobile station 100 performs control, so that it is served by the neighboring cell, which satisfies the expression (3).

At step S1208, when the determination unit 160 determines that the above-described expression (3) is not satisfied, the determination unit 160 determines not to execute the cell reselection.

Operation of the Mobile Communication System
(Version 4)

Figure 13:
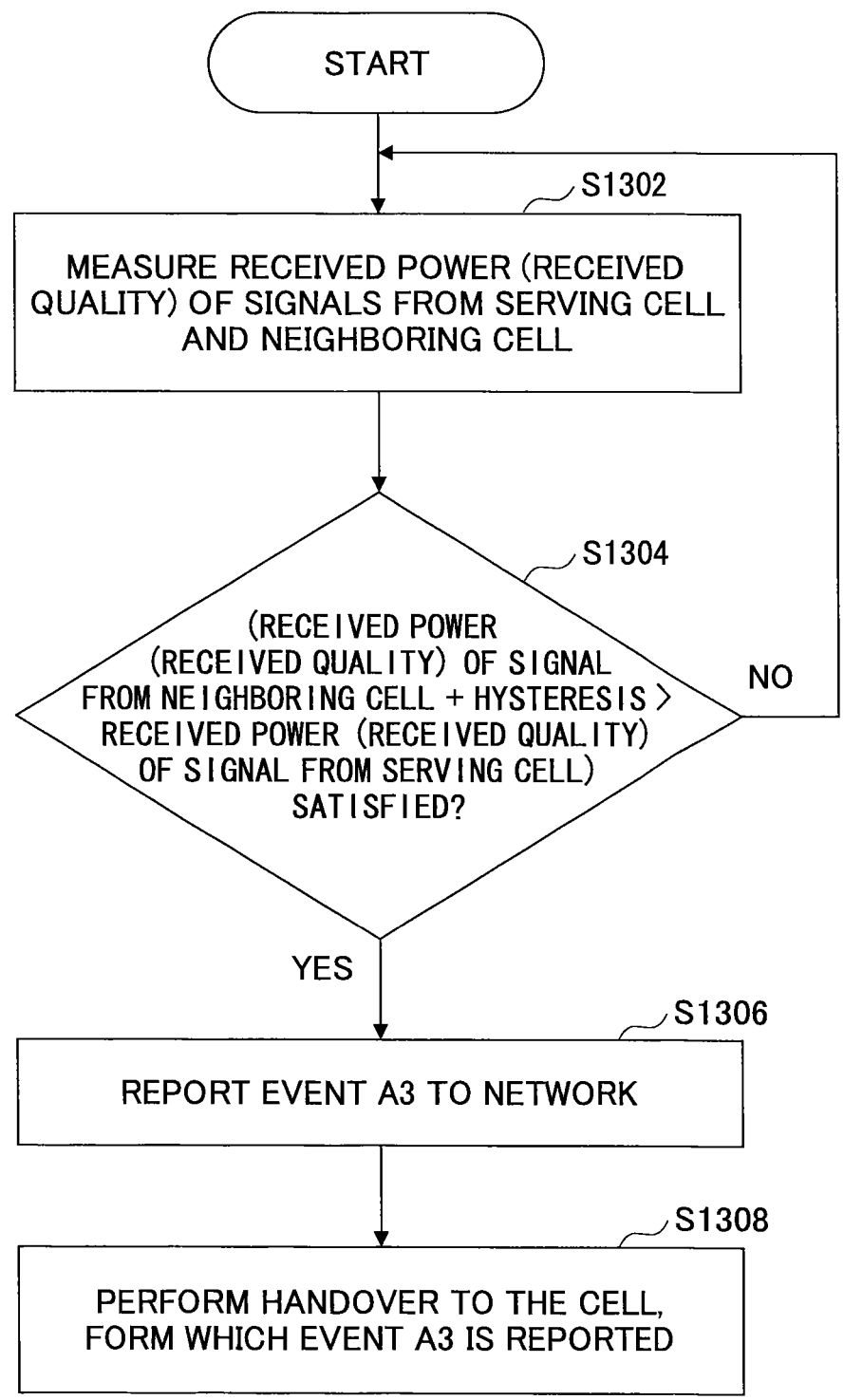
FIG. 13 is a flowchart showing an example of the operation of the mobile station.

FIG. 13 shows an example of the operation of the mobile communication system. Specifically, there is shown the operation during execution of the handover by the mobile station 100.

At step S1302, the measurement unit 156 measures at least one of the received power and the received quality of the signals from the serving cell and the neighboring cell. Additionally, the filtering unit 158 may filter the received power of the signal by using the above-described expressions (1) and (2).

At step S1304, the determination unit 160 determines whether the above-described expression (4) is satisfied, based on the at least one of the received power and the received quality of the signals from the serving cell and the neighboring cell, which is measured at step S1302.

At step S1306, when the determination unit 160 determines that the above-described expression (4) is satisfied, the reporting unit 162 reports an event, which is for reporting the measurement result, to a network. The event, which is for reporting the measurement result, is called "Event A3" for the LTE scheme, for example.

When the determination unit 160 determines that the above-described expression (4) is not satisfied, the process returns to step S1302.

At step S1308, the mobile station 100 performs handover to the cell, to which the event A3 is reported. The network which receives the communication of the event A3 determines to cause the mobile station 100 to perform the handover to the cell, which is related to the event S3.

In the above-described embodiment, the example is explained in which a determination criterion with respect to one type of radio quality is utilized. However, a determination criterion with respect to a plurality of types of the radio quality may be utilized.

Further, the example is explained in which the received power of the reference signals (RSRP) is utilized as the radio quality of the serving cell and the neighboring cell. However, the Reference Signal Received Quality Power (RSRQ), the Received Signal Strength Indicator (RS-SIR), and the Channel Quality Indicator (CQI) may be utilized. Alternatively, as the radio quality in the serving cell and the neighboring cell, at least one of the RSRP, the RSRQ, the RS-SIR, and the CQI may be utilized.

Here, the RSRQ is a value which is obtained by dividing the received power of the downlink reference signal by the downlink RSSI.

Further, the RSSI is the total reception level which is observed by the mobile station 100, and it is the reception level including all the power of the thermal noise, the interference power from another cell, and a desired signal of the own cell (cf. Non-Patent Document 1, for example).

Further, the RS-SIR is the Signal-to-Interference Ratio (SIR) of the downlink reference signal.

Furthermore, the CQI is the downlink radio quality information (cf. Non-Patent Document 5, for example).

According to the embodiment, interference by another cell can be properly measured by changing the frequency band to be measured, based on the carrier frequencies of the serving cell and the neighboring cell. Since the interference by the other cell can be properly measured, the processing load and the power consumption can be reduced, while maintaining the measurement accuracy to be constant. Especially, in the environment in which the radio quality within the system bandwidth varies depending on the frequency band, the processing load and the power consumption can be reduced, while maintaining the measurement accuracy to be constant.

The mobile station can execute measurement in a suitable frequency band, even if an interference difference from another cell exists within the system band. Accordingly, communication can be continued without disconnecting the communication, by reporting the measurement result from the mobile station to the network at a suitable timing. In addition, the load on the network and the current consumption of the mobile station can be reduced, and user convenience can be improved.

According to the embodiment, the mobile station 100 is the mobile station 100 which communicates with the radio base station 200, and which includes a measurement unit 156 configured to measure the radio quality of the serving cell and the neighboring cell in the mobile station 100. The measurement unit 156 is configured to measure the radio quality in the frequency band to be measured, which is determined by the frequency band setting unit 152 by using the carrier frequencies which are retrieved from the parameter retrieval unit 154. In this case, the measurement unit 156 is connected to the parameter retrieval unit 154.

In the embodiment, the mobile station 100 may further include the determination unit 160 configured to determine whether it is within the serving area or out of the serving area, by using the measurement result of the radio quality, which is measured by the measurement unit 156.

In the embodiment, the mobile station 100 may further include the determination unit 160 configured to determine whether the cell reselection is to be performed by using the measurement result of the radio quality, which is measured by the measurement unit 156.

In the embodiment, the mobile station 100 may further include the filtering unit 158 configured to filter the measurement result of the radio quality, which is measured by the measurement unit 156, by using the predetermined coefficient; and the determination unit 160 configured to determine whether the filtered measurement result is to be reported.

According to the embodiment, the mobile communication method includes a step of measuring the radio quality of the serving cell and the neighboring cell in the mobile station 100. The step of measuring the radio quality determines the frequency band to be measured, depending on the relationship between the carrier frequency of the serving cell and the carrier frequency of the neighboring cell.

Hereinabove, the mobile station and the communication method are explained by the embodiment. However, the present invention is not limited to the above-described embodiment, and various modifications and improvements may be made within the scope of the present invention.

Here, the operations of the radio base station 200 and the mobile station 100 may be executed by hardware, a software module which is executed by a processor, or combinations thereof.

The software module may be installed in a storage medium in a suitable form, such as a random access memory (RAM), a flash memory, a read-only memory (ROM), an erasable programmable ROM (EPROM), an electronically erasable and programmable ROM (EEPROM), a resister, a hard disk, a removable disk, or a CD-ROM.

Such a storage medium is connected with a processor, so that the processor can read information from and write information in the storage medium. Alternatively, such a storage medium may be integrated with a processor. Additionally, such a recording medium and a processor may be installed in an ASIC. Such an ASIC may be installed in a radio base station (eNB) and a mobile station (UE). Alternatively, such a storage medium and a processor may be installed in a radio base station (eNB) and a mobile station (UE) as discrete components.

The present international application is based on and claims the benefit of priority of Japanese Patent Application No. 2012-045166, filed on Mar. 1, 2012, the entire contents of Japanese Patent Application No. 2012-045166 are incorporated by reference.

LIST OF REFERENCE SYMBOLS

100: Mobile station
102: Radio communication circuit
104: CPU
106: Main storage unit
108: Auxiliary storage unit
110: Input/output unit 110
152: Frequency band setting unit
154: Parameter retrieval unit
156: Measurement unit
158: Filtering unit
160: Determination unit
162: Reporting unit
200: Radio base station

The invention claimed is:

1. A mobile station comprising:
a communication interface configured to retrieve information representing a first carrier frequency of a serving cell and a second carrier frequency of a neighboring cell from a radio base station; and
circuitry configured to
set a frequency band for measuring radio quality of the serving cell and the neighboring cell, based on the retrieved information;
measure the radio quality of the serving cell and the neighboring cell, based on the set frequency band;
filter a measurement result of the radio quality of the serving cell and the neighboring cell by using a predetermined filter coefficient; and
determine whether to report the filtered measurement result of the radio quality to the radio base station, wherein
when the second carrier frequency of the neighboring cell is included in a first frequency band of the serving cell, the circuitry is configured to set the frequency band to be a second frequency band including a second center frequency of the second carrier frequency of the neighboring cell.

2. The mobile station according to claim 1, wherein the circuitry is configured to determine whether the mobile station is within a serving area or out of the serving area, based on a measurement result of the radio quality of the serving cell.

3. The mobile station according to claim 1, wherein the circuitry is configured to determine whether a cell reselection is to be executed, based on a measurement result of the radio quality of the serving cell and the neighboring cell.

4. A mobile station comprising:
a communication interface configured to retrieve information representing a first carrier frequency of a serving cell and a second carrier frequency of a neighboring cell from a radio base station; and
circuitry configured to
set a frequency band for measuring radio quality of the serving cell and the neighboring cell, based on the retrieved information; and
measure the radio quality of the serving cell and the neighboring cell, based on the set frequency band, wherein
when the second carrier frequency of the neighboring cell is not included in the first frequency band of the serving cell; when the second carrier frequency of the neighboring cell is within a certain frequency range from an edge of the first frequency band of the serving cell; and when the first frequency band of the serving cell overlaps a third frequency band of the neighboring cell; the circuitry is configured to set the frequency band to be a fourth frequency band including a center of the overlapped frequency band.

5. A mobile station comprising:
a communication interface configured to retrieve information representing a first carrier frequency of a serving cell and a second carrier frequency of a neighboring cell from a radio base station; and
circuitry configured to
set a frequency band for measuring radio quality of the serving cell and the neighboring cell, based on the retrieved information; and
measure the radio quality of the serving cell and the neighboring cell, based on the set frequency band, wherein
when the second carrier frequency of the neighboring cell is not included in the first frequency band of the serving cell, and when the second carrier frequency of the neighboring cell is not within a certain frequency range from an end of the first frequency band of the serving cell, the circuitry is configured to set the frequency band to be a fifth frequency band including a first center frequency of the first carrier frequency of the serving cell and a sixth frequency band including a second center frequency of the second carrier frequency of the neighboring cell.

6. A mobile station comprising:

a communication interface configured to retrieve information representing a first carrier frequency of a serving cell and a second carrier frequency of a neighboring cell from a radio base station; and circuitry configured to
    set a frequency band for measuring radio quality of the serving cell and the neighboring cell, based on the retrieved information; and
    measure the radio quality of the serving cell and the neighboring cell, based on the set frequency band, wherein when the second carrier frequency of the neighboring cell is not included in the first frequency band of the serving cell, and when the first frequency band of the serving cell does not overlap a third frequency band of the neighboring cell, the circuitry is configured to set the frequency band to be a fifth frequency band including a first center frequency of the first carrier frequency of the serving cell and a sixth frequency band including a second center frequency of the second carrier frequency of the neighboring cell.

7. A communication method of a mobile station, the method comprising:

a parameter retrieval step of retrieving information representing carrier frequencies of a serving cell and a neighboring cell from a radio base station;

a frequency band setting step of setting a frequency band for measuring radio quality of the serving cell and the neighboring cell, based on the retrieved information; and a measurement step of measuring the radio quality of the serving cell and the neighboring cell, based on the set frequency band;

a filtering step of filtering a measurement result of the radio quality of the serving cell and the neighboring cell by using a predetermined filter coefficient; and a determination step of determining whether to report the filtered measurement result of the radio quality to the radio base station, wherein, when the second carrier frequency of the neighboring cell is included in a first frequency band of the serving cell, the frequency band setting step includes setting the frequency band to be a second frequency band including a second center frequency of the second carrier frequency of the neighboring cell.

* * * * *